United States Patent
Goldstein et al.

(10) Patent No.: US 6,908,524 B2
(45) Date of Patent: Jun. 21, 2005

(54) ALKYLPHENOL ETHOXYLATE-FREE SURFACTANT PACKAGE FOR POLYMER EMULSIONS

(75) Inventors: Joel Erwin Goldstein, Allentown, PA (US); Ronald Joseph Pangrazi, Fleetwood, PA (US)

(73) Assignee: Air Products Polymers, L.P., Allentown, PA (US)

(*) Notice: Subject to any disclaimer, the term of this patent is extended or adjusted under 35 U.S.C. 154(b) by 0 days.

(21) Appl. No.: 10/752,248

(22) Filed: Jan. 6, 2004

(65) Prior Publication Data

US 2004/0143046 A1 Jul. 22, 2004

Related U.S. Application Data

(62) Division of application No. 10/024,939, filed on Dec. 19, 2001, now abandoned.

(51) Int. Cl.[7] .............................. B31F 1/12; D06B 1/10; D06M 10/108; D06M 15/227; D06M 15/333
(52) U.S. Cl. .................. 156/183; 28/100; 162/112; 264/282; 524/555; 524/563; 524/585
(58) Field of Search .......................... 156/183; 28/100; 162/112; 264/282; 524/555, 563, 585; 26/100

(56) References Cited

U.S. PATENT DOCUMENTS

| | | | |
|---|---|---|---|
| 3,714,099 A | 1/1973 | Biale | 260/29.67 TA |
| 3,879,257 A | 4/1975 | Gentile et al. | 162/112 |
| 3,903,342 A | 9/1975 | Roberts, Jr. | 428/153 |
| 4,057,669 A * | 11/1977 | McConnell | 428/152 |
| 4,322,516 A | 3/1982 | Wiest et al. | 526/307.7 |
| 4,326,669 A * | 4/1982 | Moult et al. | 238/36 |
| 4,745,025 A | 5/1988 | Mao | 428/288 |
| 4,847,143 A | 7/1989 | Watanabe et al. | 428/288 |
| 5,109,063 A | 4/1992 | Cheng et al. | 524/820 |
| 5,180,772 A * | 1/1993 | Mao et al. | 524/816 |
| 5,674,590 A | 10/1997 | Anderson et al. | 428/154 |
| 5,776,306 A | 7/1998 | Hepford | 162/112 |
| 5,989,682 A * | 11/1999 | Anderson | 428/152 |
| 6,096,152 A * | 8/2000 | Anderson et al. | 156/183 |
| 6,129,815 A * | 10/2000 | Larson et al. | 162/112 |
| 6,197,878 B1 | 3/2001 | Murray et al. | 524/804 |

FOREIGN PATENT DOCUMENTS

JP 94055982 7/1994 .......... C08F/218/08

* cited by examiner

*Primary Examiner*—Kelechi C. Egwim
(74) *Attorney, Agent, or Firm*—Mary E. Bongiorno

(57) ABSTRACT

This invention is directed to formation of a creped nonwoven web. The creped web is formed in a creping process using a polymer emulsion binder formed in an alkylphenol ethoxylate-free surfactant system. The surfactant system comprises a combination of a specific active anionic surfactant (sodium laureth sulfate containing 1 to 12 moles of ethylene oxide) and a specific active nonionic surfactant (a secondary alcohol ethoxylate containing 7 to 30 moles of ethylene oxide or an ethoxylated branched primary alcohol containing 3 to 30 moles of ethylene oxide.)

18 Claims, No Drawings

ALKYLPHENOL ETHOXYLATE-FREE SURFACTANT PACKAGE FOR POLYMER EMULSIONS

CROSS REFERENCE TO RELATED APPLICATIONS

This is a divisional of patent application Ser. No. 10/024,939, filed on Dec. 19, 2001 now abandoned.

BACKGROUND OF THE INVENTION

Crepe processes, especially double recrepe (DRC) processes, have been used to produce paper products, such as paper towels and wipes, with specific properties. The DRC process involves creping a base sheet or nonwoven web on a drum, printing a polymeric binder on one side of the sheet, flash drying the binder, creping the base sheet on a drum again, printing a polymeric binder on the other side of the base sheet, flash drying the binder, and then creping the base sheet a third time. The base sheet is printed while traveling through gravure nip rolls. Various crepe processes and binding materials used in the processes are known. Examples of such processes are disclosed in U.S. Pat. No. 3,879,257, U.S. Pat. No. 3,903,342, U.S. Pat. No. 4,057,669, U.S. Pat. No. 5,674,590, and U.S. Pat. No. 5,776,306.

In order for the base sheet or web to adhere adequately to the creping drum, polymeric binders used in creping processes are typically emulsion polymers containing surfactants that are based on alkylphenol ethoxylates (APEs).

Due in part to regulations in Europe, regarding use of APE-based products, there has been a need to identify APE-free polymer emulsion binders for use in crepe processes. Known emulsion polymeric binders, that are free of APEs, have not been effective in creping processes, especially DRC processes, because they do not provide the necessary adhesion to creping drums, produce an unacceptable amount of foam, are too low in viscosity, and/or decompose at elevated temperatures causing an unacceptable odor.

Publications, such as U.S. Pat. No. 3,714,099, U.S. Pat. No. 4,745,025, U.S. Pat. No. 4,847,143, U.S. Pat. No. 5,109,063, and JP 94055982 (Abstract), disclose self-crosslinkable vinyl ester-ethylene latexes which can be use as nonwoven binders. Foamability is considered an important property for applying an emulsion binder. However this property is not desired in a creping process.

There is therefore a need for APE-free polymer emulsion binders, for use in crepe processes, that provide the necessary adhesion to creping drums while reducing the unacceptable properties described above.

BRIEF SUMMARY OF THE INVENTION

This invention is directed to an APE-free surfactant system that is used in the production of polymer emulsions and to the polymer emulsions formed therefrom. The polymer emulsions are formed by emulsion polymerization of ethylenically unsaturated monomers in the presence of a surfactant system comprising a combination of a particular anionic surfactant, i.e., a sodium laureth sulfate containing 1 to 12 moles of ethylene oxide, and a particular nonionic surfactant, i.e., a secondary alcohol ethoxylate containing 7 to 30 moles of ethylene oxide or an ethoxylated branched primary alcohol containing 3 to 30 moles of ethylene oxide. The primary or secondary alcohol can contain 7 to 18, preferably 9 to 14 carbons. The weight ratio of active anionic to active nonionic surfactant used in the preparation of the emulsion polymers can range from 4:1 to 1.5:1.

One embodiment of the invention is polymer emulsions comprising vinyl acetate, ethylene, and one or more crosslinking monomers, such as N-methylol acrylamide, formed under emulsion polymerization conditions in the presence of a surfactant system comprising a sodium laureth sulfate containing 1 to 12 moles of ethylene oxide and a secondary alcohol ethoxylate containing 7 to 30 moles of ethylene oxide or an ethoxylated branched primary alcohol containing 3 to 30 moles of ethylene oxide. The polymer emulsions are particularly useful as binders in DRC processes for making absorbent products such as wipes.

When used as binders, the polymer emulsions of this invention provide the following advantages, compared to known polymer emulsions:

after application to a cellulosic web, the web has excellent adhesion to a creping drum;

there is a minimum amount of foaming, when used in a DRC process;

they can be thickened with a hydroxyethyl cellulose based thickener prior to use;

the polymers are stable at elevated temperatures (e.g., 550° F. (280° C.); and they can be prepared in the absence of an APE surfactant.

DETAILED DESCRIPTION OF THE INVENTION

An APE-free polymer emulsion is formed by polymerizing one or more ethylenically unsaturated monomers and optionally one or more crosslinking monomers, under emulsion polymerization conditions, in the presence of a combination of a specific anionic surfactant and a specific nonionic surfactant, wherein said anionic surfactant is a sodium laureth sulfate having 1 to 12 moles of ethylene oxide, said nonionic surfactant is a secondary alcohol ethoxylate containing 7 to 30 moles of ethylene oxide or an ethoxylated branched primary alcohol containing 3 to 30 moles of ethylene oxide, said primary or secondary alcohol containing 7 to 18 carbons Ethylenically unsaturated monomers that can be used in the preparation of the polymer emulsions of this invention include, but are not limited to, vinyl esters, such as vinyl acetate, ethylene, styrene, butadiene, $C_{1-8}$ alkyl esters of acrylic and methacrylic acid, such as methyl (meth)acrylate, ethyl (meth)acrylate, butyl (meth)acrylate, hexyl (meth)acrylate, 2-ethylhexyl (meth)acrylate, diacrylates, unsaturated carboxylic acid, such as acrylic, methacrylic, crotonic, itaconic, and maleic acid, acrylonitrile, and vinyl esters of $C_{2-10}$ alcohols.

The polymer can contain up to 10% of one or more crosslinking monomers. Examples of crosslinking monomers are N-($C_{1-4}$) alkylol (meth)acrylamide, such as N-methylol acrylamide, i-butoxy methylacrylamide, acrylamidoglycolic acid, acrylamidobutyraldehyde, and the dialkyl acetal of acrylamidobutyraldehyde in which the alkyl can have 1 to 4 carbons. Any of the crosslinking monomers can be used alone, together, or in combination with acrylamide.

One embodiment of the invention is polymer emulsions comprising 50 to 90 wt % (preferably 70 to 85 wt %) vinyl acetate, 5 to 44 wt % (preferably 10 to 30 wt %) ethylene, and 1 to 10 wt % (preferably 3 to 8 wt %) one or more crosslinking monomer, based on the total weight of monomers.

Another embodiment of the invention is polymer emulsions comprising 50 to 90 wt % (preferably 70 to 85 wt %)

vinyl acetate, 5 to 44 wt % (preferably 10 to 30 wt %) ethylene, and 1 to 10 wt % (preferably 3 to 8 wt %) N-methylol acrylamide, based on the total weight of monomers The emulsion polymerization may be conducted in a stage or sequential manner and can be initiated by thermal initiators or by a redox system. A thermal initiator is typically used at temperatures at or above about 70° C. and redox systems are preferred at temperatures below about 70° C. The amount of thermal initiator used in the process is 0.1 to 3 wt %, preferably more than about 0.5 wt %, based on total monomers. Thermal initiators are well known in the emulsion polymer art and include, for example, ammonium persulfate, sodium persulfate, and the like. The amount of oxidizing and reducing agent in the redox system is about 0.1 to 3 wt %. Any suitable redox system known in the art can be used; for example, the reducing agent can be a bisulfite, a sulfoxylate, ascorbic acid, erythorbic acid, and the like. Examples of oxidizing agent are hydrogen peroxide, organic peroxides, such as t-butyl peroxide or t-butyl hydroperoxide, persulfates, and the like.

Effective emulsion polymerization reaction temperatures range from about 50 and 100° C.; preferably, 75 to 90° C., depending on whether the initiator is a thermal or redox system.

The specific combination of anionic and nonionic surfactants for the emulsion polymerization process has been shown to produce crosslinking polymer emulsions that are effective as binders in a creping process, especially a DRC process. The anionic surfactant is a sodium laureth sulfate having 1 to 12, preferably 2 to 5, moles of ethylene oxide. An example of an appropriate anionic surfactant is Disponil FES 32 IS (sodium laureth sulfate containing 4 moles of ethylene oxide), supplied by Cognis as a 30% aqueous solution. The nonionic surfactant is a secondary alcohol ethoxylate, such as 2-pentadecanol ethoxylate, containing 7 to 30 moles, preferably 12 to 20 moles, of ethylene oxide or an ethoxylated branched primary alcohol, such as tridecanol ethoxylate, containing 3 to 30 moles, preferably 9 to 20 moles, of ethylene oxide. The primary or secondary alcohol can contain 7 to 18, preferably 9 to 14 carbons. An example of an appropriate nonionic surfactant is Tergitol 15-S-20 (a secondary alcohol ethoxylate containing 20 moles of ethylene oxide), supplied by Dow as an 80% aqueous solution.

The amount of active surfactant, based on total polymer, can be 1 to 5 wt % (preferably 1.5 to 2 wt %) for the anionic surfactant and 0.25 to 5 wt % (preferably 0.5 to 1.5 wt %) for the nonionic surfactant. The weight ratio of anionic to nonionic surfactant can range from 4:1 to 1.5:1. A weight ratio of 65:35 (anionic:nonionic surfactant) has been found to give a latex that provides appropriate adhesion to creping drums, has a moderate viscosity with little foam generation, results in less off-gassing than APE-based latexes, and has an accelerated sedimentation of no greater than 1%.

At about 30% solids, the polymer emulsions, when used as binders, should have a viscosity of 5 to 80 cps and should be capable of being thickened to 100 cps with a thickener, such as a hydroxyethyl cellulose-based thickener. Viscosity is measured using a Brookfield viscometer, Model LVT, spindle #3 at 60 rpm. The emulsion polymers of this invention should also be stable at temperatures up to about 550° F. (288° C.), produce a minimal amount of foam when pumped and when beaten during a DRC process, and adhere to a creping drum when used as a nonwoven binder. Adhesion to the creping drum can be evaluated by various methods; e.g., using a mill scale machine, or a pilot scale DRC line. A modified release and adhesion test procedure has been found to provide accurate data regarding effectiveness of a binder in a creping process, especially a DRC process. The modified test procedure is described in the example.

The polymer emulsions of this invention can be used as binders in creping processes well known in the art. Examples of creping processes are described in the publications listed in the "Background of the Invention" section of the specification. Nonwoven webs typically used in a creping process are wood pulp (alone or blended with natural or synthetic fibers) processed by a dry (air-laid, carded, rando) or wet-laid process.

The amount of binder applied to the web can vary over a wide range; for example, about 5 to 40%; preferably 10 to 35% of the finished product. When the products are wiper products, it is desirable to keep the amount to a minimum.

The invention will be further clarified by a consideration of the following example, which is intended to be purely exemplary of the use of the invention.

EXAMPLE

Emulsion polymerization of vinyl acetate, ethylene, and N-methylol acrylamide was carried out in presence of various surfactant systems in a one-gallon stirred, stainless steel reaction vessel equipped with a jacket. In Run 1, reaction vessel was charged initially with 883.5 g of deionized water, 126.75 g of Disponil FES 32 IS, 25.625 g of Tergitol 15-S-20, 0.91 g of sodium citrate, 3.5 g of 50% aqueous citric acid, 2.3 g of 5% aqueous ferric ammonium sulfate and 312.0 g of vinyl acetate. While stirring, 240.0 g of ethylene was introduced below the surface of the liquid in the reaction vessel in order that the interpolymers would have a vinyl acetate:ethylene ratio of about 80:20. The reaction vessel was heated to 50° C. Upon equilibration, the following four aqueous solutions were intermittently added to the reaction vessel over the course of the reaction (on a delay basis); 15% sodium formaldehyde sulfoxylate (SFS), 3.0% t-butylhydroperoxide (t-bhp), 1246.0 g of vinyl acetate and 324.0 g of a 30% aqueous solution of N-methylol acrylamide (NMA). After three hours, the vinyl acetate delay was terminated, after four hours the NMA delay was complete and the other two delays continued for another 30 minutes. The reaction was terminated by cooling.

Using the same emulsion recipe as Run 1, several surfactant packages were examined. The viscosity, emulsion stability, accelerated sedimentation, and peel were measured.

Viscosity was measured using a Brookfield Viscometer, Model LVT, spindle #3 @ 60 rpm and 77° F. (25° C.), at about 24 hours after preparation to allow for cooling and the finishing of any residual-free monomer.

Emulsion stability was measured by measuring the viscosity at 4 intervals: after forming the polymer emulsion; after 3 days in a 120° F. oven; after 1 week in a 120° F. oven; and after 2 weeks in a 120° F. oven.

Accelerated sedimentation was measured by taking a sample of the polymer emulsion product and diluting it in half with water, spinning it in a centrifuge for five minutes at a predetermined setting, e.g., 2800 rpm±100, and measuring the amount of precipitate forced to the bottom of the tube. When a one-gallon reactor is used, an accelerated sedimentation higher than 1% is considered unsatisfactory. However in a plant-size operation, up to about 3% is acceptable.

Peel was measured using a modified release and adhesion tester. A 2-inch×6-inch×1/32-inch stainless steel plate was attached to a movable heated (350° F.; 177° C.) inclined (45°) metal platform and allowed to equilibrate to the temperature of the platform (2 minutes.) Approximately 0.42 g of the polymer emulsion was applied to a 1½-inch×6-inch piece of bleached, mercerized cotton poplin. The jaws of a Testing Machine, Inc. gram tensile measuring apparatus were attached to a long end of the cotton poplin. The coated side of the coated cotton poplin was then pressed onto the heated stainless steel plate with a 3-pound lab roller by rolling the lab roller back and forth over the substrate for 10 seconds. After 30 seconds, the stainless steel plate was moved away from the tensile measuring device (to which the substrate was attached) at a rate of 12 inches/minute (30.48 cm/minute). The amount of force needed to remove the cotton from the stainless steel plate was recorded and compared to AIRFLEX® 105 vinyl acetate-ethylene (VAE) polymer emulsion control. The results are reported as peel (% of control) in the table below:

The polymeric binder of Run 1 showed a peel value of 100% of the AIRFLEX 105 VAE emulsion control and had excellent viscosity as well as a good value for accelerated sedimentation. Other representative examples of the binders of this invention (Runs 2–9) also gave good peel values, however accelerated sedimentation is higher than desired. Although good adhesion and no off-gassing was observed using the binders of Runs 10, 11, 12, 13, and 14, in which DOSS was the anionic surfactant, the binder was too thin, could not be effectively thickened with hydroxyethyl cellulosic thickeners, and showed excessive foaming. The stability of the binder in Run 15 was unacceptable. Off-gassing was observed using the binder of Run 16, making it unacceptable as a binder for a crepe process.

What is claimed is:

1. In a method for forming a bonded and creped nonwoven web which comprises: applying a polymer emulsion binder to a nonwoven web to form a coated nonwoven web, drying the coated nonwoven web, and subsequently creping said dried coated nonwoven web in a crepe process, the

TABLE

| Run | Anionic surfactant | Nonionic surfactant | Ratio of Anionic to Nonionic | % Solids | Viscosity, cps | Accelerated Sedimentation, % | Peel Value (% control) |
|---|---|---|---|---|---|---|---|
| 1 | Disponil FES 32 IS | Tergitol 15-S-20 | 1.86 | 52.9 | 660 | 1.0 | 100 |
| 2 | B-330S | Tergitol 15-S-20 | 1.86 | 53.2 | 532 | 4.0 | 47 |
| 3 | Rhodapex ES | Tergitol 15-S-20 | 1.86 | 53.2 | 632 | 2.5 | 73 |
| 4 | FES 993 | Tergitol 15-S-20 | 1.86 | 53.1 | 160 | 8.0 | 57 |
| 5 | Steol 4N | Tergitol 15-S-20 | 1.86 | 53.1 | 348 | 2.0 | 48 |
| 6 | Texapon NSO | Tergitol 15-S-20 | 1.86 | 53.2 | 152 | 6.0 | 75 |
| 7 | Disponil FES 32 IS | Disponil 3065 | 1.86 | 53.3 | 600 | 3.0 | 175 |
| 8 | Disponil FES 32 IS | Disponil 1080 | 1.86 | 53.3 | 490 | 4.0 | 200 |
| 9 | Disponil FES 32 IS | TD-3 | 1.86 | 53.0 | 318 | 2.0 | 110 |
| 10 | DOSS | Tergitol 15-S-20 | 1.86 | 57.0 | 86 | 1.0 | 135 |
| 11 | DOSS | Tergitol 15-S-20 | 1 | 53.4 | 372 | 0.5 | 100 |
| 12 | DOSS | Tergitol 15-S-20 | 3 | 53.1 | 54 | 1.0 | 35 |
| 13 | DOSS | Tergitol 15-S-20 | 0.33 | 53.3 | 116 | 0.5 | 130 |
| 14 | DOSS | Tergitol 15-S-20 | 0.67 | 60.3 | 474 | 1.5 | 105 |
| 15 | Tergitol 15-S-3 sulfate | Tergitol 15-S-20 | 2 | 55.8 | 600 | 10 | 68 |
| 16 | DOSS | Tergitol 15-S-3 | 0.67 | 60.5 | 228 | 3.5 | 90 |
| 17 | EST-30 | Makon TD-3 | 2 | 54.2 | 810 | 1.5 | 67 |

Disponil FES 32 IS = sodium laureth sulfate containing 4 moles of ethylene oxide, supplied by Cognis
Tergitol 15-S-20 = a secondary alcohol ethoxylate containing 20 moles of ethylene oxide, supplied by Dow
B-330S = sodium laureth sulfate (3 moles) supplied by Stepan
Rhodapex ES = sodium laureth sulfate (3 moles) supplied by Rhodia
FES 993 = sodium laureth sulfate (1 mole) supplied by Cognis
Steol 4N = sodium laureth sulfate (4 moles) supplied by Stepan
Texacon NSO = sodium laureth sulfate (2 moles) supplied by Cognis
DOSS = dioctyl sulfosuccinate
Tergitol 15-S-3 Sulfate = secondary alcohol ethoxylate sulfate (3 moles) supplied by Dow
EST-30 = sodium trideceth sulfate (3 moles) supplied by Rhodia
Disponil 3065 = lauryl alcohol ethoxylate (30 moles) supplied by Cognis
Disponil 1080 = lauryl alcohol ethoxylate (10 moles) supplied by Cognis
Makon TD-3 = tridecyl alcohol ethoxylate (3 moles) supplied by Stepan improvement which comprises using an alkylphenol ethoxylate-free polymer emulsion binder formed by polymerizing vinyl acetate, ethylene, and one or more crosslinking monomers, under emulsion polymerization conditions, in the presence of a combination of an anionic surfactant and a nonionic surfactant, wherein said anionic surfactant is a sodium laureth sulfate having 1 to 12 moles of ethylene oxide, said nonionic surfactant is a secondary alcohol ethoxylate containing 7 to 30 moles of ethylene oxide or an ethoxylated branched primary alcohol containing 3 to 30 moles of ethylene oxide, said primary or secondary alcohol containing 7 to 18 carbons.

2. The method of claim 1 wherein the one or more crosslinking monomers is selected from the group consisting of a N-($C_{1-4}$) alkylol (meth)acrylamide, i-butoxy methylacrylamide, acrylamidoglycolic acid, acrylamidobutyraldehyde, a dialkyl acetal of acrylamidobutyraldehyde, said alkyl having 1 to 4 carbons, and acrylamide in combination with one or more of the aforementioned crosslinking monomers.

3. The method of claim 1 wherein the crosslinking monomer is N-methylol acrylamide.

4. The method of claim 1 wherein the polymer emulsion comprises 50 to 90 wt % vinyl acetate, 5 to 49 wt % ethylene, and 1 to 10 wt % of N-methylol acrylamide, based on the total weight of monomers.

5. The method of claim 1 wherein the polymer emulsion comprises 70 to 85 wt % vinyl acetate, 10 to 30 wt % ethylene, and 3 to 8 wt % of N-methylol acrylamide, based on the total weight of monomers.

6. The method of claim 1 wherein said anionic surfactant is a sodium laureth sulfate containing 2 to 5 moles of ethylene oxide and said nonionic surfactant is a secondary alcohol ethoxylate having 12 to 20 moles of ethylene oxide or an ethoxylated branched primary alcohol containing 9 to 20 moles of ethylene oxide, and the weight ratio of anionic to nonionic surfactant ranges from 4:1 to 1.5:1.

7. The method of claim 1 wherein said anionic surfactant is a sodium laureth sulfate containing 4 moles of ethylene oxide and said nonionic surfactant is a secondary alcohol ethoxylate having 20 moles of ethylene oxide.

8. The method of claim 7 wherein said nonionic surfactant is tridecanol ethoxylate containing 9 to 20 moles of ethylene oxide.

9. The method of claim 1 wherein the weight ratio of anionic surfactant to nonionic surfactant is 65:35.

10. The method of claim 1 wherein the crepe process is a double recrepe process.

11. The method of claim 10 wherein the one or more crosslinking monomers is selected from the group consisting of a N-($C_{1-4}$) alkylol (meth)acrylamide, i-butoxy methylacrylamide, acrylamidoglycolic acid, acrylamidobutyraldehyde, a dialkyl acetal of acrylamidobutyraldehyde, said alkyl having 1 to 4 carbons, and acrylamide in combination with one or more of the aforementioned crosslinking monomers.

12. The method of claim 10 wherein the crosslinking monomer is N-methylol acrylamide.

13. The method of claim 10 wherein the polymer emulsion comprises 50 to 90 wt % vinyl acetate, 5 to 49 wt % ethylene, and 1 to 10 wt % of N-methylol acrylamide, based on the total weight of monomers.

14. The method of claim 10 wherein the polymer emulsion comprises 70 to 85 wt % vinyl acetate, 10 to 30 wt % ethylene, and 3 to 8 wt % of N-methylol acrylamide, based on the total weight of monomers.

15. The method of claim 10 wherein said anionic surfactant is a sodium laureth sulfate containing 2 to 5 moles of ethylene oxide and said nonionic surfactant is a secondary alcohol ethoxylate having 12 to 20 moles of ethylene oxide or an ethoxylated branched primary alcohol containing 9 to 20 moles of ethylene oxide, and the weight ratio of anionic to nonionic surfactant ranges from 4:1 to 1.5:1.

16. The method of claim 10 wherein said anionic surfactant is a sodium laureth sulfate containing 4 moles of ethylene oxide and said nonionic surfactant is a secondary alcohol ethoxylate having 20 moles of ethylene oxide.

17. The method of claim 16 wherein said nonionic surfactant is tridecanol ethoxylate containing 9 to 20 moles of ethylene oxide.

18. The method of claim 10 wherein the weight ratio of anionic surfactant to nonionic surfactant is 65:35.

\* \* \* \* \*